US011556675B2

(12) United States Patent
Bennison (10) Patent No.: US 11,556,675 B2
(45) Date of Patent: Jan. 17, 2023

(54) SYSTEM AND METHOD FOR PROVIDING SECURITY SERVICES WITH MULTI-FUNCTION SUPPLY CHAIN HARDWARE INTEGRITY FOR ELECTRONICS DEFENSE (SHIELD)

(71) Applicant: NORTHROP GRUMMAN SYSTEMS CORPORATION, Falls Church, VA (US)

(72) Inventor: James E. Bennison, Oakton, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 312 days.

(21) Appl. No.: 16/715,523

(22) Filed: Dec. 16, 2019

(65) Prior Publication Data
US 2021/0182436 A1    Jun. 17, 2021

(51) Int. Cl.
*G06F 21/73* (2013.01)
*G06F 21/44* (2013.01)
(Continued)

(52) U.S. Cl.
CPC .............. *G06F 21/73* (2013.01); *G06F 21/44* (2013.01); *H04L 9/0643* (2013.01);
(Continued)

(58) Field of Classification Search
CPC .......... G06F 21/73; G06F 21/44; G06F 7/588; G06F 2221/2103; G06F 2221/2129; G06F 21/6209; G06F 21/71; H04L 9/0643; H04L 9/0869; H04L 9/0877; H04L 2209/38; H04L 9/083; H04L 9/14; H04L 9/3239;
(Continued)

(56) References Cited

U.S. PATENT DOCUMENTS 8,519,826 B2    8/2013  Turner
9,568,421 B2    2/2017  Farmer et al.
(Continued)

FOREIGN PATENT DOCUMENTS

WO    2017027648    2/2017

OTHER PUBLICATIONS

Kun Yang, et al. , "An RFID-based Technology for Electronic Component and System Counterfeit Detection and Traceability", ECE Dept., University of Connecticut, {kuy12001, forte, tehrani}@engr.uconn.edu, 2015 IEEE International Symposium on Technologies for Homeland Security (HST), pp. 1-6.
(Continued)

*Primary Examiner* — Mohammed Waliullah
(74) *Attorney, Agent, or Firm* — Katten Muchin Rosenman LLP (57) ABSTRACT

A system and a method for a supply-chain hardware integrity for electronics defense (SHIELD) dielet embedded over a component of a device, a radio frequency identification (RFID) probe system coupled to the SHIELD dielet, and a secure server system communicating with the RFID probe system that can enable security services is provided. Embodiments include a multi-function SHIELD software defined, hardware enabled security system that provides hardware identity, anti-tamper, encryption key generation and management, trusted platform module services, and cryptographic software security services for a device.

14 Claims, 7 Drawing Sheets

(51) Int. Cl.
*H04L 9/08* (2006.01)
*G06F 7/58* (2006.01)
*H04L 9/00* (2022.01)
*H04L 9/06* (2006.01)
*H04W 12/47* (2021.01)

(52) U.S. Cl.
CPC .......... *H04L 9/0869* (2013.01); *H04L 9/0877* (2013.01); *H04W 12/47* (2021.01); *G06F 7/588* (2013.01); *G06F 2221/2103* (2013.01); *H04L 9/50* (2022.05)

(58) Field of Classification Search
CPC ........... H04L 2209/805; H04L 9/0897; H04W 12/47; H04W 12/069; H04W 12/106; H04W 12/108
See application file for complete search history.

(56) References Cited

U.S. PATENT DOCUMENTS

| | | | |
|---|---|---|---|
| 9,684,862 | B2 | 6/2017 | Andry et al. |
| 2007/0290036 | A1* | 12/2007 | Yang ........................ G06F 21/35 235/382 |
| 2016/0026776 | A1* | 1/2016 | Hurst ................... G06F 21/602 713/165 |
| 2016/0275461 | A1 | 9/2016 | Sprague et al. |
| 2016/0300234 | A1 | 10/2016 | Moss-Pultz et al. |
| 2017/0169250 | A1 | 6/2017 | White |
| 2017/0180390 | A1 | 6/2017 | Plouchart et al. |
| 2017/0294062 | A1* | 10/2017 | Van Wiemeersch ........................ G07C 9/00309 |
| 2018/0114220 | A1 | 4/2018 | Ekberg |
| 2020/0302132 | A1* | 9/2020 | Takayama ........ G06K 19/07749 |
| 2021/0012073 | A1* | 1/2021 | Suko .................. G06K 19/0723 |
| 2021/0174634 | A1* | 6/2021 | Purohit ................. H04L 9/0894 |

OTHER PUBLICATIONS

Pim Tuyls, et al., "RFID-Tags for Anti-Counterfeiting", Philips Research Laboratories, Prof. Holstlaan 4, 5656 AA, Eindhoven, The Netherlands, Katholieke Universiteit Leuven, ESAT/COSIC, Katholieke Universiteit Leuven, ESAT/COSIC, Kasteelpark Arenberg 10, B-3001 Leuven-Henerlee, Belgium, {Pim.Tuyls, Lejla.Batina}@esat.kuleuven.ac.bePim.Tuyls@philips.com, Cryptographers' Track at the RSA Conference, pp. 115-131.

Phil Taylor, "DARPA unveils first images of chip 'dielet'", Sep. 9, 2015, SecuringIndustry.com—DARPA unveils first images of chip 'dielet', Jun. 10, 2018, https://www.securingindustry.com/electronics-and-industrial/darpa-unveils-first-images-of-chip-dielet-/s105/a2503/ , 2 sheets.

Larry Greenemeier, "The Pentagon's Seek-and-Destroy Mission for Counterfeit Electronics", DARPA is developing microscopic chips to help crack down on knockoff parts destined for weapons and satellite systems, Scientific American, Apr. 28, 2017, https://www.scientificamerican.com/article/the-pentagon-rsquo-s-seek-and-destroy-mission-for-counterfeit-electronics/, 8 sheets.

* cited by examiner

SYSTEM AND METHOD FOR PROVIDING SECURITY SERVICES WITH MULTI-FUNCTION SUPPLY CHAIN HARDWARE INTEGRITY FOR ELECTRONICS DEFENSE (SHIELD)

BACKGROUND

Currently radio frequency identification (RFID) chips are typically affixed to or embedded in products or goods that are portable, and RFID probes are available to communicate with the RFID chips. However, none of currently available RFID probes is designed to be permanently installed on a host system and connected to a network to continuously communicate with an RFID chip, and none of the RFID probes is designed to use the RFID chip to provide security services for host systems such as electronic devices. The system and method of the disclosed invention advances the state-of-art of the prior art which is a supply chain hardware integrity for electronics defense (SHIELD) dielet which is designed to provide hardware identity services for anti-counterfeiting and asset tracking. The design concept of the SHIELD dielet is to perform authentication communicating with a central database of a secure server system, which contains a unique, immutable shared-secret cipher key provisioned to the dielet at the time of manufacture. By utilizing cryptographic primitives of the SHIELD dielet, the system and method of the disclosed invention improves on the prior art by providing services such as: assured software distribution for integrity and resilience services, high-assurance quantum-resistant symmetric encryption key exchange and management service for data confidentiality, high-assurance over-the-network device identity and authentication services, host system anti-tamper integrity services, trusted platform module (TPM) security services, and other software-defined capabilities developed now or in the future.

For software updating and patch distribution services, currently software distribution channels are conditional on the integrity of vendors' distribution models, but the vast number of vendors and shortage of trained engineers to secure them leaves a huge and highly vulnerable attack surface. Many threat actors have successfully evaded the outdated security controls in place today in the software supply chain. Examples include the STUXNET worm which evaded detection by using forged Microsoft code signing certificates which exploited the vulnerability of the MD5 hashing algorithm used to create the certificates, which had already been deprecated by NIST but which was still in use on the Microsoft Certificate Authority servers, demonstrating that even the most advanced and trusted software vendors are vulnerable to attack by sophisticated threat actors. Another example is the Xcode Ghost exploit where the Apple iOS app development environment was modified to implant malware in apps compiled by unwitting developers and submitted to the App Store, again utilizing forged signing certificates to evade detection. Currently there is no universal standard or method for assurance of software update distribution services that customers can rely on other than untrustworthy tools, methods and distribution channels used by software vendors.

Blockchain is an emerging technology that could improve the integrity of software distribution, industry experts such as Gartner say that "Blockchain provides greater levels of security . . . and offers unquestionable provenance of anything conveyed over the network." However, there are no solutions in use at the current time that utilize it for software distribution.

For encryption key exchange services, Transport Layer Security (TLS) and Secure Sockets Layer (SSL) are cryptographic protocols that provide communications security over a computer network using asymmetric public/private key pairs provided by a Public Key Infrastructure (PM). Both SSL and TLS suffer from various key management vulnerabilities described in RFC 5246: "The system is only as strong as the weakest key exchange and authentication algorithm supported, and only trustworthy cryptographic functions should be used. Short public keys and anonymous servers should be used with great caution. Implementations and users must be careful when deciding which certificates and certificate authorities are acceptable; a dishonest certificate authority can do tremendous damage." Also, with the imminent availability of quantum computing, asymmetric key encryption is at risk due to the ability of quantum computers to quickly discover the private key for any entity's public key, which threatens to make asymmetric cryptography and the entire PM infrastructure untrustworthy.

Currently there is an inability by system owners/operators to securely manage encryption keys to provide confidentiality of data transmitted over untrusted networks. Most current solutions depend on software solutions such as public key infrastructure (PM), which is nearing the end of its useful life with the impending availability of quantum computing which can rapidly factor the large prime number key-pairs that asymmetric-key cryptography depends on. High-assurance symmetric key encryption solutions designed to protect government sensitive or classified data are available such as the FORTEZZA card system, but they are expensive to procure, install and maintain, and because they depend on maintaining the secrecy of the shared keys they are labor intensive for securely handling the keying material. Newer hardware crypto key systems approved by NSA exist such as the MV product line, but they are also expensive and labor intensive to operate and maintain.

For network device authentication, most but not all modern mobile devices have a universal device identification (UDID), compliant with standards such as the International Mobile Equipment Identity (IMEI) that can uniquely fingerprint the device and provide remote device authentication. However, non-mobile network authentication solutions are limited by the absence of a UDID in most general purpose computing devices. In 1999 Intel began embedding a unique processor serial number (PU) into their new class of Pentium III CPU chips during the manufacturing process, but due to an outcry from consumers and governments over privacy issues Intel eventually removed it. Consequently, there is no reliable hardware-enforced method to uniquely identify the majority of network connected computing devices being manufactured or used today.

Hardware and software integrity services are vulnerable to tampering by threat actors, and for all but the most expensive hardware based anti-tamper protections, threat actors with physical access to computing devices can steal or exploit technologies that protect critical technology (CT) and critical program information (CPI) in a number of ways such as removing and replacing non-volatile storage media like hard drives with ones containing compromised software, installing network interface cards (NIC) that have implants designed to eavesdrop on network traffic, and implanting malware in the system BIOS and peripheral component firmware that cannot be detected by commercial off-the-shelf (COTS) anti-virus software.

Certain Trusted Platform Module (TPM) chips and firmware manufactured by vendors including ST Microelectronics and Intel have been found to have side-channel timing attack flaws that allow threat actors to defeat the cryptographic protections provided by these vulnerable TPMs. These hardware flaws likely cannot be mitigated entirely by merely installing software patches, but require replacement of the flawed hardware in order to fully mitigate these vulnerabilities.

What is needed is a hardware-enforced technology that can produce unclonable unique and immutable cryptographic keys to deliver mathematically verifiable identity and authentication of a device over the network. What is needed is a hardware-enforced technology that can produce unclonable unique cryptographic keys that can be used to calculate unique cryptographic hashes of software received over the network that mathematically bind it to the hardware's unique identity to prove receipt by adding it to a public blockchain ledger. What is needed is a hardware-enforced technology that can produce unclonable cryptographic shared-secret key-generation keys that can be used to calculate symmetric encryption keys and exchange them securely to provide quantum-immune encryption of network communications. What is needed is a hardware-enforced technology that can produce unclonable unique cryptographic keys that can be used to calculate unique cryptographic hashes to fingerprint software, firmware, hardware and other elements of a computing device to provide detection and protection from being tampered with, stolen or replaced. What is needed is a hardware-enforced technology that can provide high-assurance security services equivalent to those provided by Trusted Platform Modules (TPMs), but is not subject to the hardware vulnerabilities of legacy solutions and can be used to replace flawed TPMs.

SUMMARY

Embodiments include a system and method that provide hardware-enforced, software defined high-assurance security features for computing systems by utilizing cryptographic capabilities of SHIELD dielet which is designed to provide to hardware identity and data security services.

These and others advantages may be provided by, for example, a multi-function SHIELD security system that provides hardware identity and security services for a device. The SHIELD security system includes a SHIELD dielet containing an immutable shared-secret cipher key, an RFID probe system coupled to the SHIELD dielet, and a secure server system including one or more secure servers communicating with the RFID probe system. The SHIELD dielet is placed inside the device.

The SHIELD dielet may be affixed on a component of the device and/or the RFID probe system. The RFID probe system may be installed inside the device. Specifically, the RFID probe system may be installed in a peripheral component interconnect (PCI) card of the device. The RFID probe system may communicate with the SHIELD dielet through radio frequency (RF) signals. The immutable shared-secret cipher key may be registered with the secure sever system at the time that the SHIELD dielet is provided for the component. The security services may include one or more services of assured software updating service, encryption key generation, exchange or management, network device or remote device authentication, software-defined host system anti-tamper, or trusted platform module (TPM) services.

These and others advantages may be also provided by, for example, a method for performing authentication of a device by using a multi-function SHIELD security system in which a RFID probe system communicates with a SHIELD dielet and a secure server system to verify authentication of a component of a device. The method includes sending challenge request messages from the secure server system, creating challenge response data using the SHIELD dielet upon receiving the challenge request messages, transmitting challenge responses to the secure server system, and determining a status of the SHIELD dielet based on the challenge responses. An immutable shared-secret cipher key is registered with the secure sever system, and the SHIELD dielet contains the immutable shared-secret cipher key.

The immutable shared-secret cipher key may be registered with the secure sever system at the time that the SHIELD dielet is provided for the component. The method may further include creating a temporary session cipher key that may include receiving a high-entropy random number from the secure server on the RFID probe system, generating the temporary cipher key on the secure server using cryptographic operations on a combination of the received random number and the SHIELD dielet's shared-secret cipher key, and generating the matching cipher key on the RFID probe system using the same cryptographic operations on the combination of the received random number and the SHIELD dielet's shared-secret cipher key, whereby identical temporary symmetric cipher keys are independently created without revealing the resulting cipher key over the network. The method may also include periodically creating the challenge request messages and transmitting the challenge request messages including the challenge data to the SHIELD dielet, and receiving the challenge responses from the SHIELD dielet. The method may also include creating a hash of software or data at the time of transmission and installation or updating on the device by using the cipher key of the SHIELD dielet, and registering the hash with a blockchain ledger registration server or the secure server system. Verification of the software provenance and confirmation that was installed on the authenticated device which the SHIELD dielet is affixed to is provided. The method may also include fingerprinting software or firmware or hardware members of the device, and registering the fingerprinted software or firmware or hardware members with the secure server system. The hardware members may include one or more selected from a group consisting of removable storages, network interface cards (NICs), system BIOSes, and devices connected to the local network segment.

The method may further include generating random numbers using hardware random number generator (RNG) capabilities of the SHIELD dielet, generating cryptographic keys for limited uses by utilizing a hardware encryption engine of the SHIELD dielet, generating secure hash algorithm 1 (SHA-1) hashes utilizing the hardware encryption engine of the SHIELD dielet, binding data by performing cryptographic operations using the cipher key of the SHIELD dielet as the storage root key (SRK) such that the data cannot be decrypted by any other computing device if the encrypted data is lost or stolen, sealing data by performing cryptographic operations on the data using the cipher key of the SHIELD dielet and the device configuration information including the hardware and software used such that the data cannot be unsealed by any other combination of hardware and software, and storing said encrypted or sealed data in persistent memory on the RFID probe system such that the data is protected from theft or tampering, whereby data confidentiality and integrity is provided. The method may further include receiving a request for said data from an authorized application, decrypting or unsealing said data by performing cryptographic operations using the cipher key of the SHIELD dielet and the device configuration information, and transmitting said data from the RFID probe system to the authorized application.

DETAILED DESCRIPTION

It is to be understood that the figures and descriptions of the present invention may have been simplified to illustrate elements that are relevant for a clear understanding of the present invention, while eliminating, for purposes of clarity, other elements found in a typical mobile applications architecture or typical method for sharing data. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings.

Embodiments of the disclosed invention include a software-defined hardware-enabled RFID probe system. The RFID probe system may include processors, memories and logic circuits, which may be manufactured into a hardware module or personal computer (PC) expansion card with an attached antenna coil which can be affixed over, for example, the SHIELD™ dielet manufactured by Northrop Grumman which is embedded in a computing device's system processor or other electronic component(s). The RFID probe system of the embodiments may communicate with the SHIELD dielet and with the network to which the computing device is connected, enabling communication with remote management systems in order to provide multiple security functions by accessing a unique, immutable cipher key, a random number generator and a hardware accelerated encryption engine contained in the SHIELD dielet. These security functions may include but are not limited to: 1) assured software transmission and updating service, 2) secure encryption key exchange with remote key management systems, 3) device authentication with remote authentication systems over the network, 4) peripheral component fingerprinting and monitoring to provide anti-tamper capabilities, 5) a peripheral Trusted Platform Module (TPM), as well as 6) other features enabled by the SHIELD dielet hardware that can be defined in software now or in the future.

The SHIELD dielet provides hardware root-of-trust through an integration of advanced key protection and cryptographic techniques including a Physically Unclonable Function (PUF) technology. The dielet is intended to be embedded in electronic components, such as processors or chips, in the device or system at the time of manufacture for the purpose of providing anti-counterfeiting protection.

The RFID probe system of the disclosed invention may include processors, memories and logic circuits (see FIGS. 2-4), and may be built as an expansion card, in a form factor such as a mini-peripheral component interconnect (PCI) express (mini-PCIe) card that can be installed in most computing devices. The RFID probe system continuously, on power up, or at other pertinent intervals, communicates over radio frequencies (RF) with the SHIELD dielet(s) embedded in one or more components of a computing device, and in the event that the host computing device does not have a SHIELD dielet installed, the disclosed RFID probe system may also have a SHIELD dielet embedded in a component on-board its own circuitry. The RFID probe system may allow remote management systems to access the features of the SHIELD dielet via the network interface of the computing device in order to provide communication between the SHIELD dielet and the remote management systems over the network. This communication may allow execution of software features and functions such as those noted in items 1 through 6 above. In another embodiment, the RFID probe system may be built in other form-factors such as a hardware module that may include processors, memories, logic circuits, and interfaces such as universal serial bus (USB) or other types of interfaces to be connected to computing devices. These embodiments of the RFID probe system may communicate with the SHIELD dielet through RF signals, and may communicate with the remote management systems through a network interface of the computing device to which the hardware module is connected. Alternatively, the RFID probe system may have its own network interface capability to connect the remote management systems.

Figure 1:
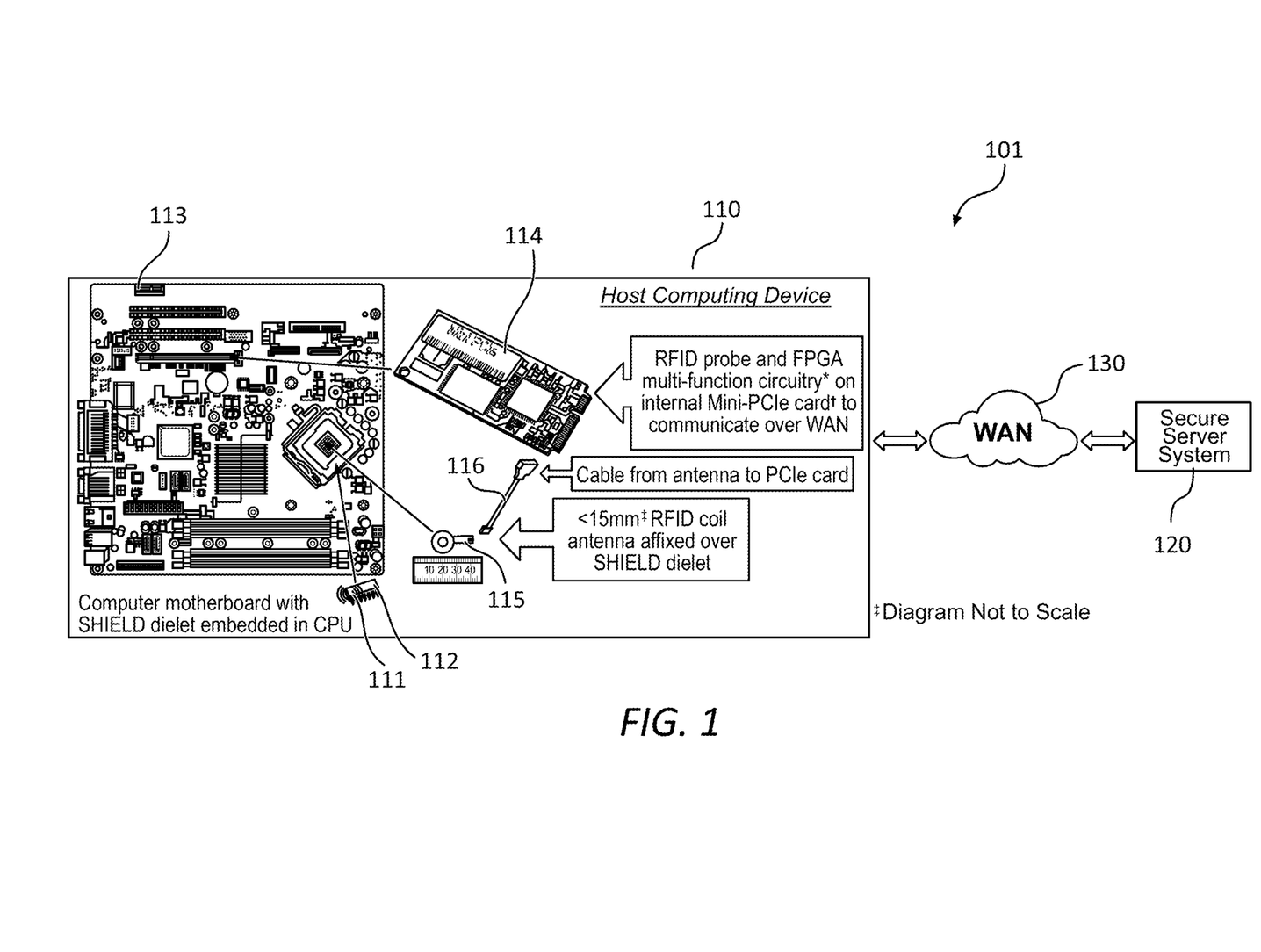
FIG. 1 shows an exemplary diagram of the multi-function SHIELD security system in which the RFID probe system is formed as a PC expansion card.
Figure 2:
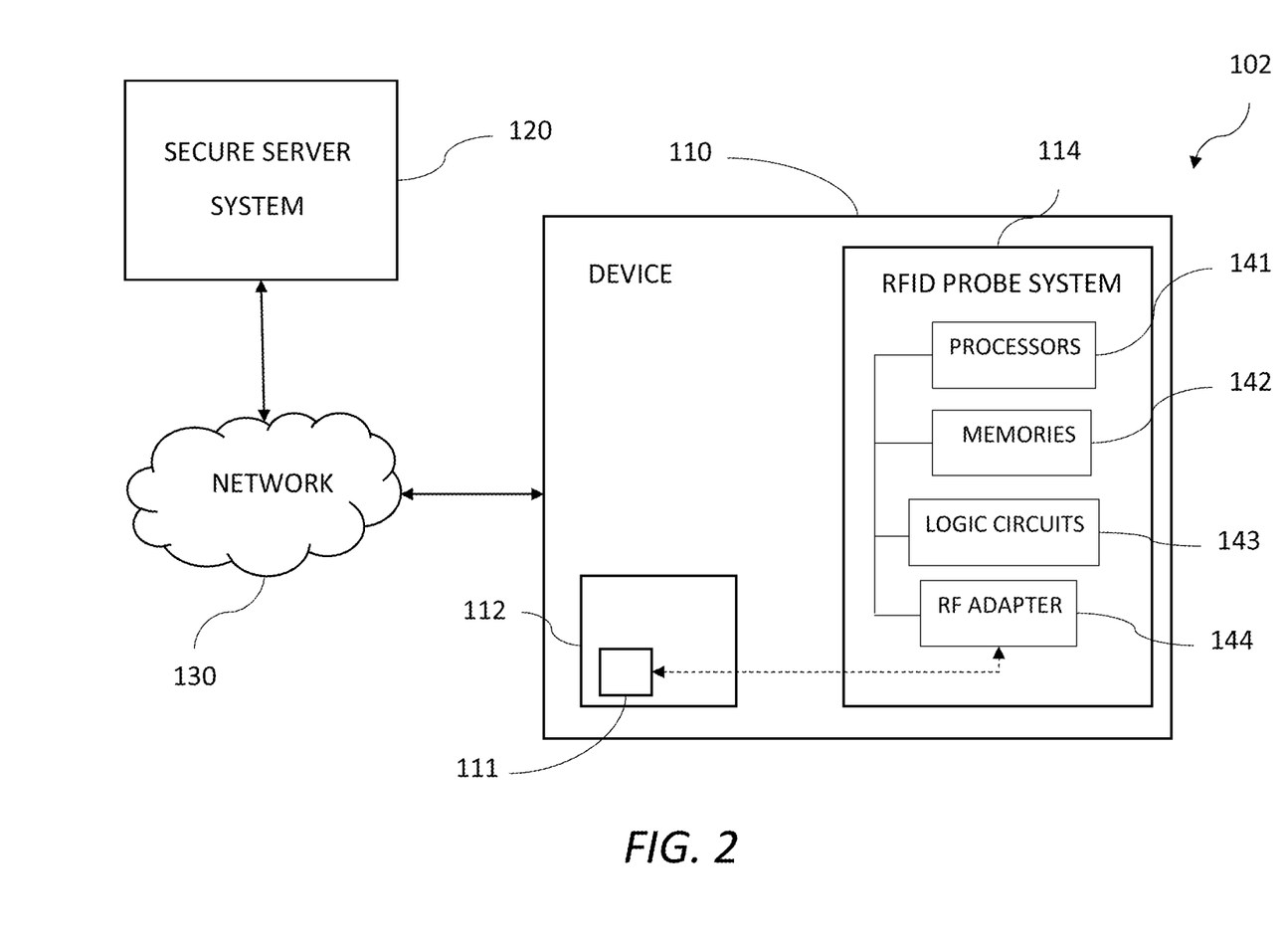
FIG. 2 shows a diagram of an embodiment of the multi-function SHIELD security system where the RFID probe system is installed inside a device in which SHIELD dielet is placed.
Figure 3:
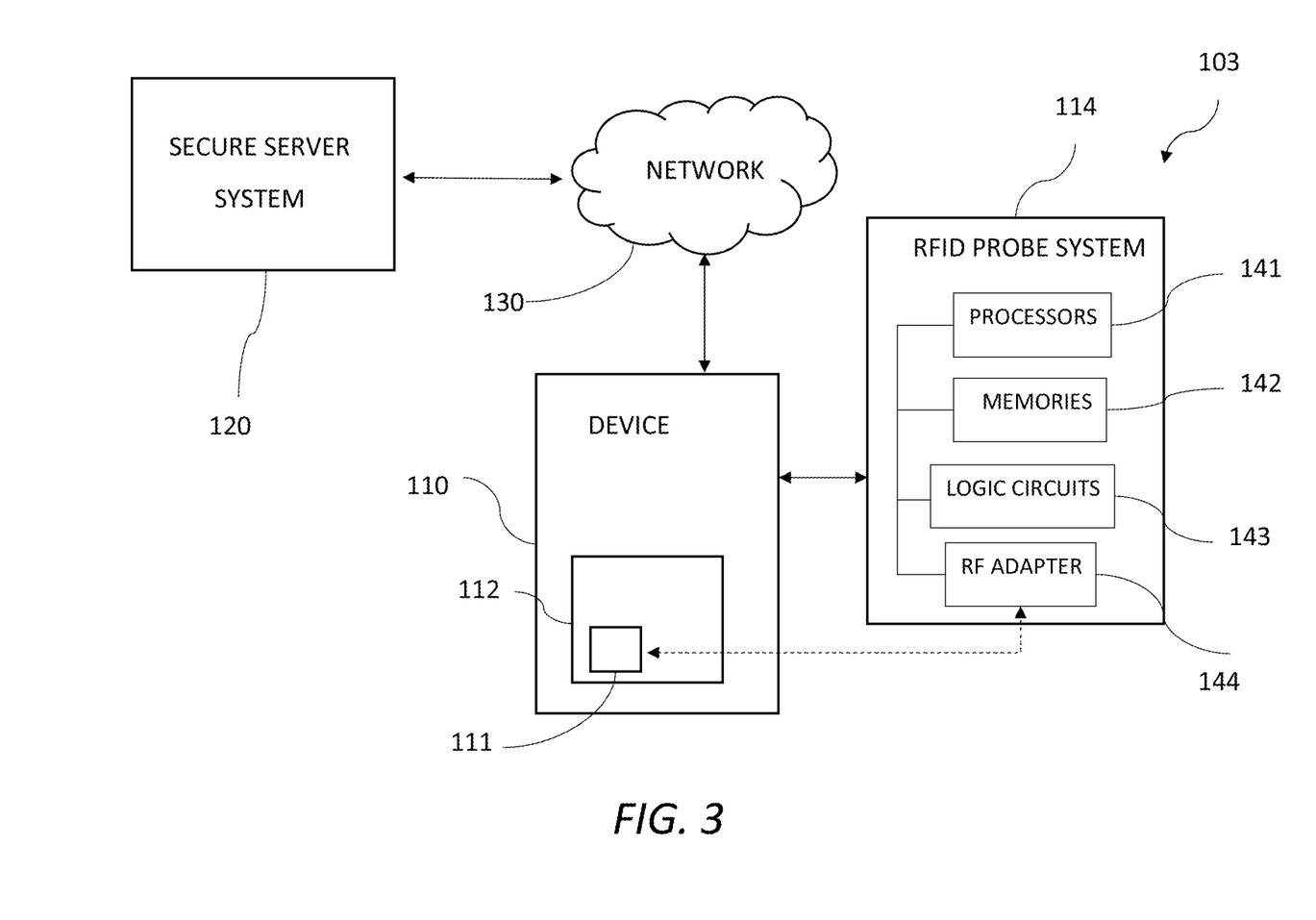
FIGS. 3 and 4 show diagrams of embodiments of the multi-function SHIELD security systems in which the RFID probe systems are built as external devices.
Figure 4:
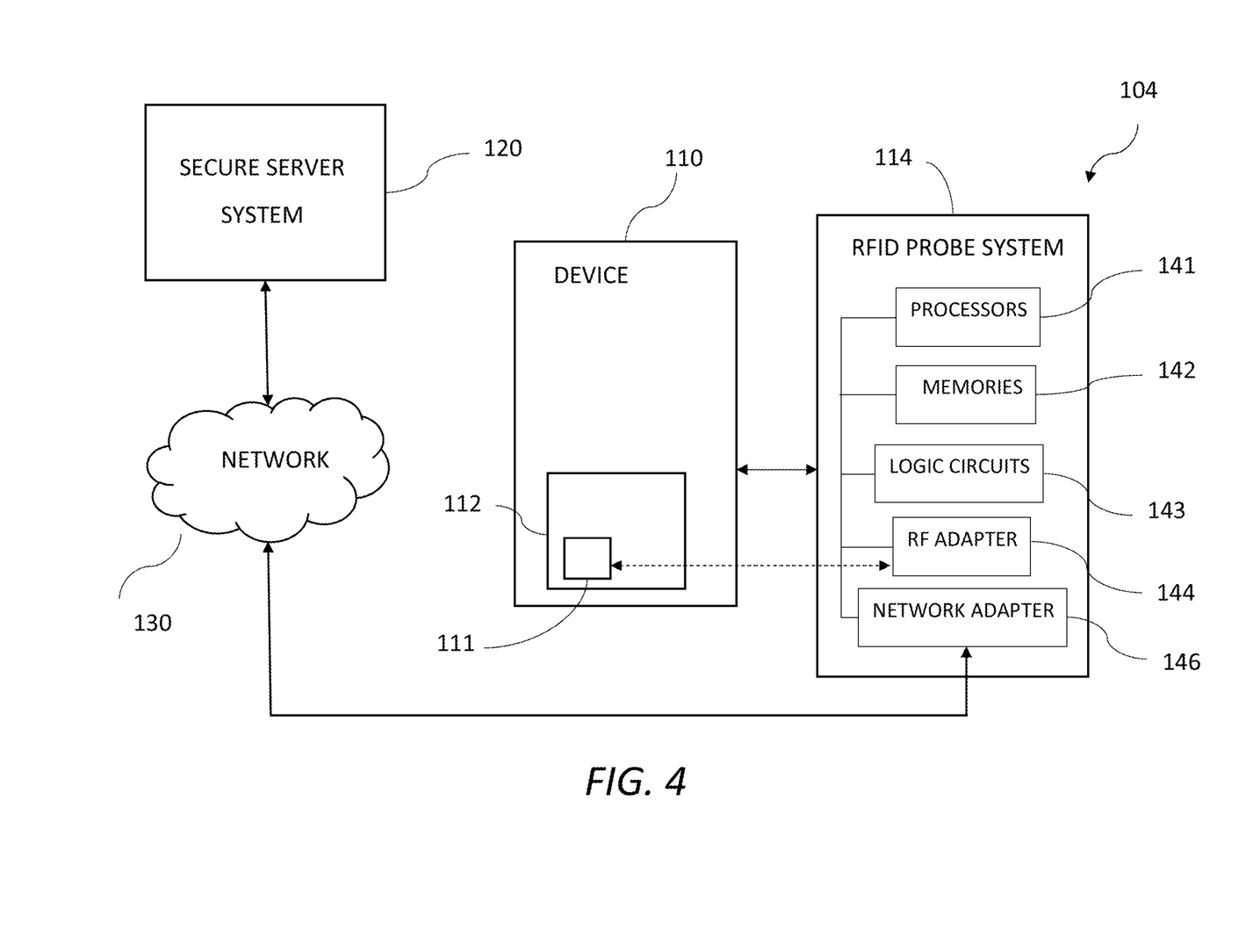

With reference to FIGS. 1-4, shown are diagrams illustrating embodiments of multi-function SHIELD security systems. Referring to FIG. 1, shown is an exemplary diagram of the host system 101 in which the RFID probe system is embodied as a PC expansion card 114 and is installed in an internal PCIe slot of a COTS motherboard with an antenna affixed near a SHIELD dielet affixed to or embedded in a processor affixed to the COTS motherboard or other electronic component of the host environment. Referring to FIG. 2, shown is a diagram of an embodiment of the system 102 in which the RFID probe system is installed inside a computing device in which SHIELD dielet is placed. Referring to FIGS. 3 and 4, shown are diagrams of embodiments of the systems 103 and 104, respectively, which are alternate embodiments to that shown in 102, in which the RFID probe systems are built as external devices that are connected to host devices to which SHIELD dielets are affixed but where there is no PCIe slot available through interfaces such as USB ports. In the system 103 shown in FIG. 3, an RFID probe system 114 communicates with a secure server system 120 using network facilities of a host computing device 110. In the system 104 shown in FIG. 4, the RFID probe system 114 communicates with the secure server system 120 through its own network facilities 146.

Referring to FIGS. 1-4, the multi-function SHIELD security systems 101 through 104 include the SHIELD dielet 111 embedded in or permanently affixed to an electronic component 112 such as a chip or processor, an element installed in the electronic package 113, an RFID probe system 114 that may include processors 141, memories 142, logic circuits 143, communication adapters 144 such as RF signal adapters to communicate with the SHIELD dielet 111, and a secure server system 120 communicating with the RFID probe system 114 through the network facilities of the computing device 110 in which the dielet 111 is placed, or through network facilities of the RFID probe system if the RFID probe system 114 is built as an external device having its own network adapter 146. The electronic component 112 is an element installed in the electronic package 113. The RFID probe system 114 may further include field programmable gate array (FPGA) multi-function circuitry.

For the communication between the RFID probe system 114 and the SHIELD dielet 111, an RF antenna 115 may be affixed over SHIELD dielet 111, and may connect to the RFID probe system through wires such as a cable 116. The RFID probe system 114 communicates with a secure server system 120 through a wide area network (WAN) 130 or other networking methods.

The hardware enforced security capabilities of the SHIELD security system utilized by the disclosed invention can then be employed to provide multiple security functions, such as those compliant with the Trusted Platform Module (TPM) specification defined in ISO/IEC 11889:2015. The multi-function SHIELD security system of the disclosed invention provides advantages for the security functions including but not limited to the following: assured software updating service, encryption key exchange or management, network device or remote device authentication, software-defined host system anti-tamper, and hardware anti-counterfeit. These security functions that can be provided by the logic circuits 143 referring to FIGS. 1-4 are described in the embodiments below.

In one embodiment, Assured Software Updating Services can be provided by utilizing cryptographic methods to create trusted software hashes and other critical data such as anti-virus signatures which can be hashed and optionally registered with an authorized blockchain ledger provided by a trusted source (i.e., software developer/vendor) to assure the provenance, authenticity and integrity of the software or data received over the network. The immutable key contained in the SHIELD dielet can also be used to create a derived hash at the time of software or data installation on the computing device to register the hash at the blockchain ledger registration server. The immutable key contained in the SHIELD dielet is also recorded in a database on a remote management system to cryptologically verify that the authenticated software was indeed installed on the system authenticated to the dielet's unclonable key. This capability will provide software provenance assurance and software supply chain security.

Currently every software vendor provides their own software update distribution mechanism and none of them have been proven to be immune from compromise. For example, Microsoft has improved the state-of-the-art in recent years with their "auto-updating" service for Windows systems, but they have concentrated on making it easier for users with faster update cycles to minimize the window of opportunity that "zero-day" vulnerabilities have to cause harm, however, fraudsters have still found ways to infiltrate this distribution channel and insert malware. The system in the disclosed invention could provide a trustworthy distribution channel protected by a distributed blockchain ledger and available in the public commons for all vendors to use, thereby protecting software provenance during distribution from point of origin to point of use regardless of the software vendor.

The unclonable hardware root-of-trust provided by the dielet's immutable device-unique ID can be used as the input to an algorithm to create a blockchain hash which provides trustworthy software source authentication and can also provide a proof of installation digital signature hash to prove end-to-end data provenance of the software. The system and method of the disclosed invention provides assured software and anti-virus signature delivery, attestation and non-repudiation, and provides authenticatable endpoint patch compliance tracking. The system can also create software (S/W) "white-list" digital signatures that can be used to enable a Trusted Computing Base (TCB) that can block unauthorized software (e.g., malware) at execution time, and enables secure boot and recovery from "Gold Image" to provide software resilience by enabling trusted backup and restore capability. Central key registration server enables encrypted and blockchain secured S/W updates over air-gapped interfaces (e.g., portable maintenance systems). The system of the disclosed invention reduces system administration manpower requirements, and the automated secure restore and re-boot from "Gold Image" provides software resilience.

In another embodiment, an encryption key exchange or management function can be provided by utilizing the hardware enforced device-unique immutable key in the SHIELD dielet that can be used as the shared-secret Crypto Ignition Key (CIK) to create a short lived session-encryption key (temporary session cipher key) that is changed frequently. Details of one possible key exchange mechanism and procedures are defined in the NSA public-key exchange Firefly (aka Photuris) protocol as explained in IETF RFC 2522 and approved by the NSA for use in electronic key management systems (EKMS) for encryption of unclassified and classified data, or the Payment Card Industry's (PCI) protocol called Derived Unique Key Per Transaction (DUKPT) specified in ANSI X9.24 part 1, or the Key Management Interoperability Protocol (KMIP), or any other similar protocol that follows the key management lifecycle guidelines in NIST Special Publication 800-130. Keys exchanged using any of these methods should also comply with Committee on National Security Systems (CNSS) advisory memorandum 02-15 which specifies approved quantum-resistant algorithms and key lengths. These capabilities can provide over the air re-keying (OTAR) services for data transmission confidentiality.

The disclosed invention also provides a method for using the SHIELD's shared-secret immutable hardware key to provide a more light-weight, inexpensive and easy to use key management system compliant with the NSA's crypto modernization initiative for securely exchanging quantum-resistant symmetric keys to use with high-strength encryption algorithms, thereby protecting the confidentiality of data in transit between systems.

Figure 5A:
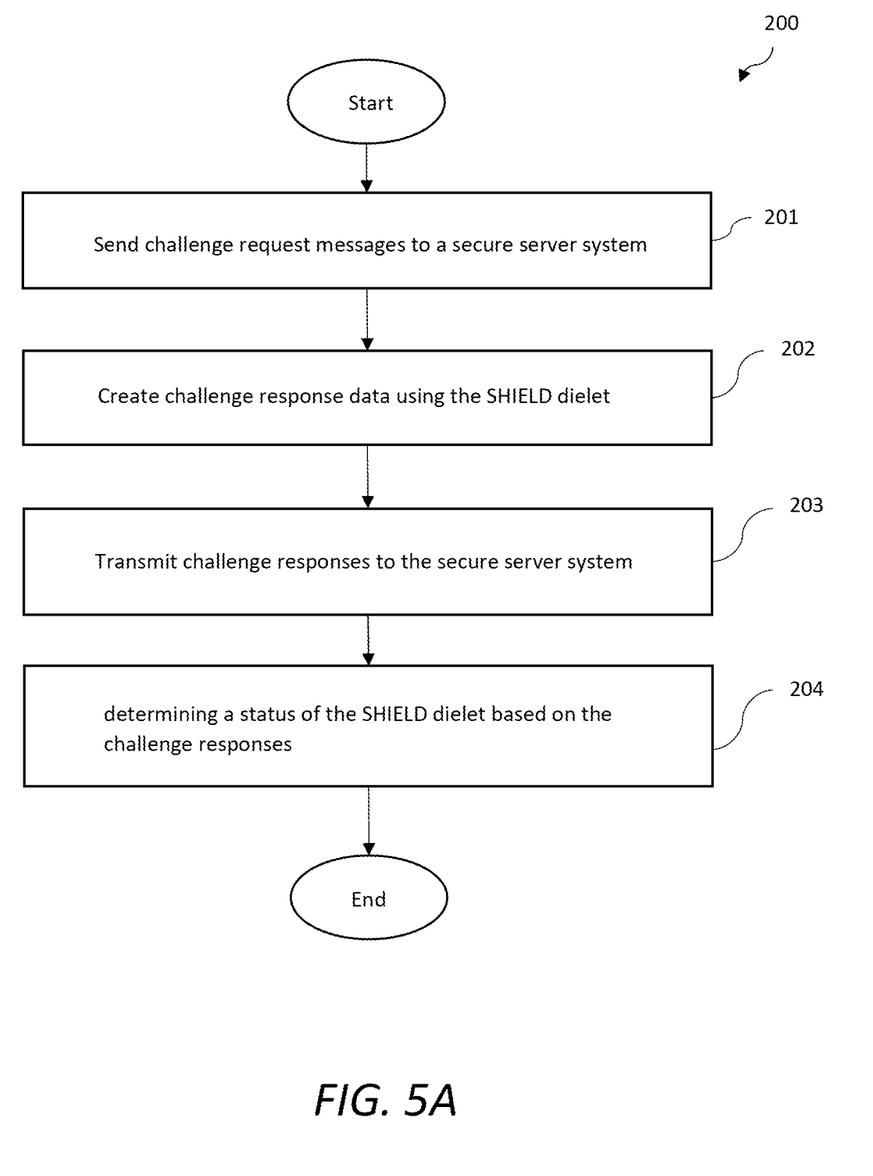
FIGS. 5A-5C show overview diagrams illustrating methods for performing authentication of a device by using a multi-function SHIELD security system.

With reference to FIG. 5A, shown is a workflow diagram of a method of the disclosed invention for performing authentication of a device by using a multi-function SHIELD security system in which a RFID probe system communicates with a SHIELD dielet and a secure server system to verify authentication of a component of a device. The method 200 includes steps of sending challenge request messages from the secure server system, block 201. In this step, an immutable shared-secret cipher key has previously been registered with the secure sever system, and the SHIELD dielet contains the immutable shared-secret cipher key. The method also includes creating challenge response data proving possession of the immutable shared-secret cipher key by the SHIELD dielet upon receiving the challenge request messages, block 202, transmitting challenge responses to the secure server system, block 203, and determining a status of the SHIELD dielet based on the challenge responses, block 204.

Figure 5B:
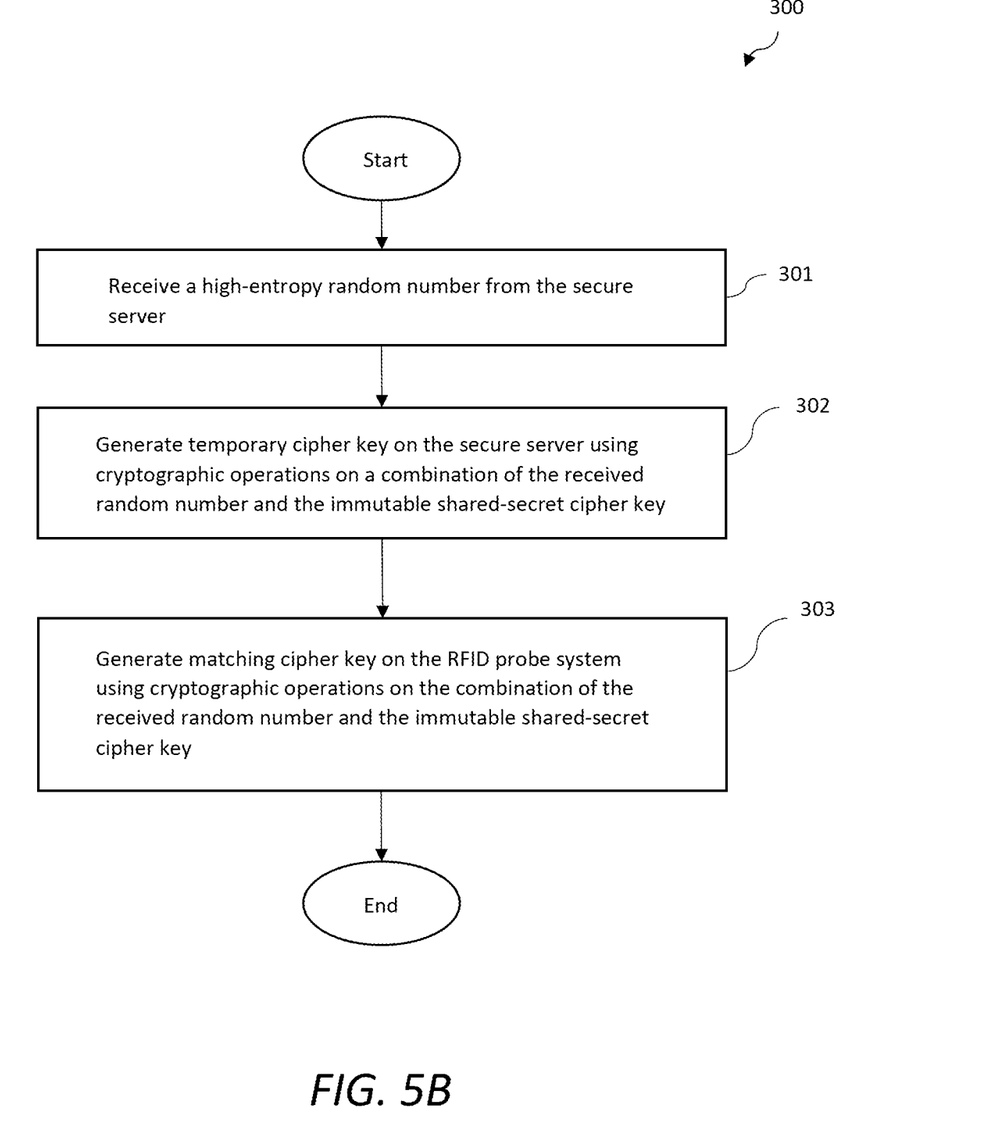

With reference to FIG. 5B, the method 200 may further include a method 300 of creating a temporary session cipher key. In the method 300, a high-entropy random number may be received from the secure server on the RFID probe system, block 301. The temporary cipher key may be generated on the secure server using cryptographic operations on a combination of the received random number and the SHIELD dielet's shared-secret cipher key, block 302. The matching cipher key may be generated on the RFID probe system using the same cryptographic operations on the combination of the received random number and the SHIELD dielet's shared-secret cipher key, block 303, whereby identical temporary symmetric cipher keys are independently created without revealing the resulting matching cipher key over the network. The method may further include steps of periodically creating the challenge request messages and transmitting the challenge request messages including the challenge data to the SHIELD dielet, receiving the challenge responses from the SHIELD dielet, creating a hash of software or data at the time of transmission and installation or updating on the device by using the cipher key of the SHIELD dielet, registering the hash with a blockchain ledger registration server or the secure server system. Verification of the software provenance and confirmation that was installed on the authenticated device which the SHIELD dielet is affixed to is provided. The method may further include fingerprinting software or firmware or hardware members of the device, and registering the fingerprinted software or firmware or hardware members with the secure server system. The hardware members may include one or more selected from a group consisting of removable storages, network interface cards (NICs), system BIOSes, and devices connected to the local network segment.

The immutable shared-secret cipher key when combined with a high-entropy random number (initialization vector) could be used as key-generation key for session keys (cipher keys). The system of the disclosed invention provides key management features that exceed COTS TPM chip assurance specifications, and can support NSA Firefly, KMIP, PCI DUKPT or other standards-based key exchange protocols. Session key generated and exchanged using SHIELD's unclonable, hardware enforced shared-secret cipher key provides authentication, non-repudiation and hardware root-of-trust over the network. In the system of the disclosed invention, the automated quantum-resistant network crypto key exchange and management provides increased security at reduced operational cost. The system of the disclosed invention enables full-disk data at rest (DAR) encryption using SHIELD's immutable cipher key to provide hardware-enforced data confidentiality.

In another embodiment a network device or remote device authentication system can be provided. The disclosed invention may include an expansion card that can be permanently installed in a computing device such that it can communicate over RF frequencies with the dielet by using an attached antenna in order to transmit the two-way authentication handshake between the dielet and the remote authentication system (secure server system) via the network connection of the computing device in which the card is installed. These capabilities can provide periodic or continuous high-assurance device authentication and central asset management system services.

The state-of-the-art today is the 802.1x standard which defines the protocol for key management and the establishment of secure associations, but it depends almost entirely on the factory-assigned media access control (MAC) address of a network interface on a networked device which can be changed in software or trivially spoofed by malware.

The Trusted Platform Module (TPM) chips and firmware equivalents also can provide hardware/firmware enforced security services including cryptographic processing capabilities that include random number generator, facilities for the secure generation of RSA cryptographic keys, facilities for the secure generation of SHA-1 hashes, anti-tamper by creating and securely storing a nearly unforgeable hash key summary of the hardware and software configuration, binding or encrypting that encrypts data using the TPM bind key, a unique RSA key descended from a storage root key (SRK), and sealing which is similar to binding but also specifies the TPM system state (e.g., system installed hardware and software configurations) for the data to be decrypted (unsealed). The encrypted or sealed data may be stored in a persistent memory, which may be included in the memories 142, on the RFID probe system such that the data is protected from theft or tampering. The disclosed invention can provide these TPM security services, thereby providing a high-assurance hardware root-of-trust solution to supplement or replace existing TPM chip functions.

Figure 5C:
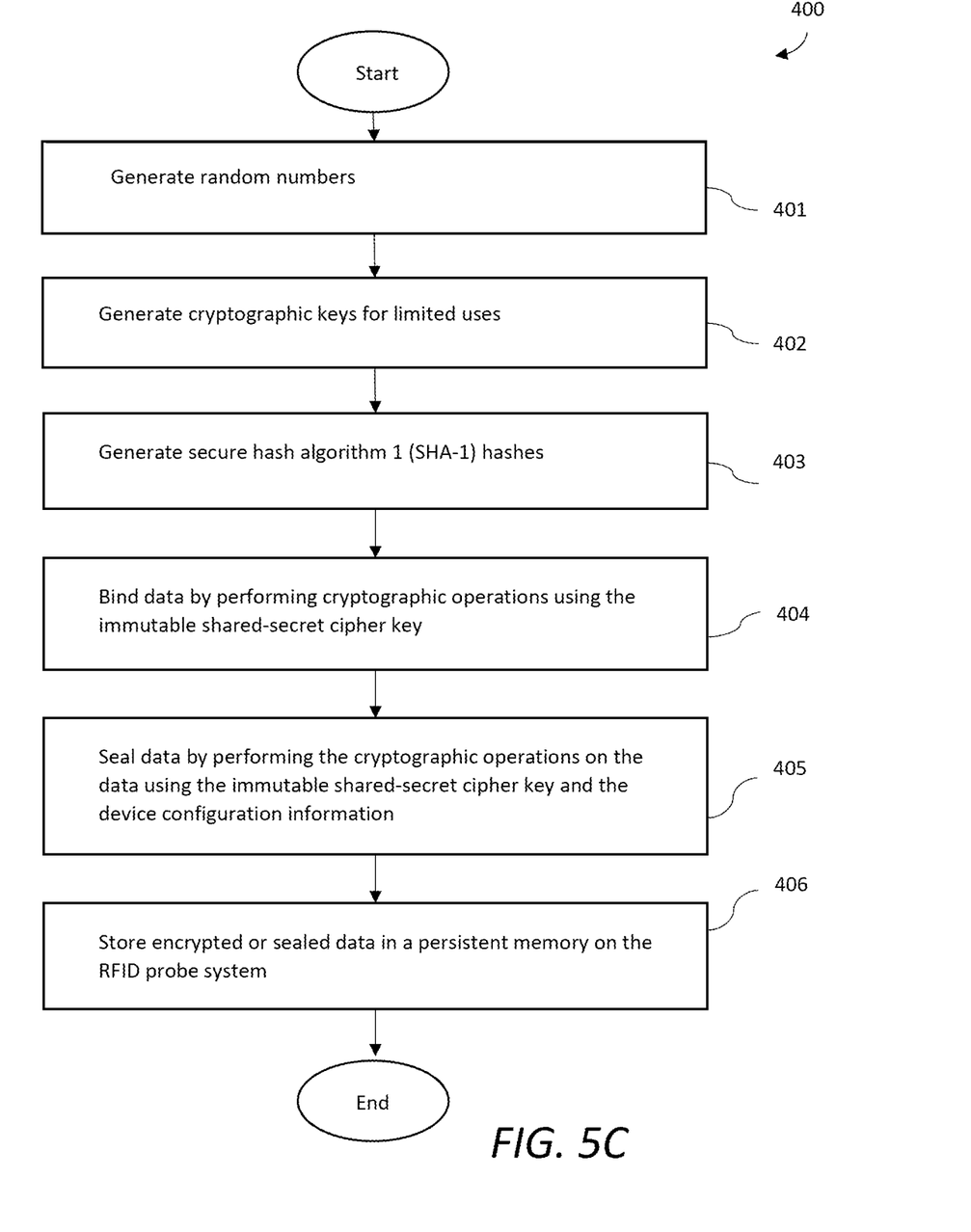

With reference to FIG. 5C, the method 200 may further include a method 400 of sealing data. In the method 400, random numbers are generated using a hardware random number generator (RNG) capabilities of the SHIELD dielet, block 401. Cryptographic keys for limited uses are generated by utilizing a hardware encryption engine of the SHIELD dielet, block 402. Secure hash algorithm 1 (SHA-1) hashes are generated utilizing the hardware encryption engine of the SHIELD dielet, block 403. Data is bound by performing cryptographic operations using the immutable shared-secret cipher key as a storage root key (SRK), block 404. After the data is bound, the data cannot be decrypted by any other computing device if the encrypted data is lost or stolen. Data is sealed by performing the cryptographic operations on the data using the immutable shared-secret cipher key and the device configuration information including the hardware and software used, block 405. After sealing data, the data cannot be unsealed by any other combination of hardware and software. The encrypted or sealed data is stored in a persistent memory on the RFID probe system, block 406. The data is protected from theft or tampering, whereby data confidentiality and integrity is provided. When a request for said data from an authorized application is received, the data is decrypted or unsealed by performing cryptographic operations using the immutable shared-secret cipher key and the device configuration information. Then, the data is transmitted to the authorized application from the RFID probe system.

The unclonable hardware (H/W) cipher key (PUF key) provides immutable network root-of-trust device authentication by remote central authentication server, and provides authentication of portable, intermittently connected and air-gapped devices. The immutable PUF key enables centralized asset tracking and management system, provides asset tracking on the network, and provides attribution of network traffic. The benefit of the system of the disclosed invention is that it allows automated host device authentication over the network at boot-up and continuously during operation instead of aperiodic labor-intensive on-site disassembly and inspection to access the SHIELD chip using hand-held RFID probes. These functionalities of the system also enable traffic attribution and centralized asset tracking, rogue device detection and management remotely over the network to provide increased security at lower operational cost, In another embodiment a software-defined host system anti-tamper capability could be provided for hard drives, Network Interface Cards (NIC) etc. with software/firmware that can be fingerprinted and registered to the host system using various techniques. Storage devices have "defect tables" marking bad sectors that did not pass error checking which can be employed as an immutable identifier utilizing "manufacturing differences" that are unique to every device that can be used as a fingerprint. NICs have unique media access control (MAC) addresses that are burned in the hardware at manufacture time. Software has file hash tables that can be used as fingerprints, and some may even be registered on a blockchain ledger. System BIOS and attached peripheral firmware can also be added to hash tables to create fingerprints. Endpoints connected to the local network segment can be fingerprinted to detect the appearance of rogue devices or detect changes signaling that the host has been moved/relocated on the network. These various device fingerprints can be used to create a binding between the SHIELD chip's immutable cipher key and the component's fingerprint using cryptographic methods that can then be monitored to provide tamper indicators that detect changes to provide integrity protection for the host system and attached peripherals.

Currently the U.S. DoD is the primary user of hardware anti-tamper solutions, but they are expensive to engineer, implement and maintain and therefore generally used only on weapons systems and the like. Anti-tamper software is used in many types of products including; embedded systems, financial applications, software for mobile devices, network-appliance systems, anti-cheating in games, military, license management software, and digital rights management (DRM) systems. But general purpose computing devices typically depend on commercial grade security hardening to make it more difficult for threat actors to tamper, and fault-tolerance to allow devices to survive or automatically recover from tampering. The disclosed invention can employ the SHIELD hardware's cryptographic capabilities to generate a database of fingerprints created from a computing device's software, hardware and firmware and optionally register them on a blockchain, and then use its protected position directly attached to the computing device's bus to monitor for unexpected and/or unauthorized changes and then alert the system owner locally or a system management secure server remotely, and can also optionally enact appropriate countermeasures in real-time to prevent unintended behavior or malicious effects on the system, thereby providing tamper detection and protection of system integrity.

The terms and descriptions used herein are set forth by way of illustration only and are not meant as limitations. Those skilled in the art will recognize that many variations are possible within the spirit and scope of the invention and the embodiments described herein.

What is claimed is:

1. A multi-function supply chain hardware integrity for electronics defense (SHIELD) security system that provides hardware identity and security services for a device, comprising:
   a SHIELD dielet containing an immutable shared-secret cipher key, wherein the SHIELD dielet is placed inside the device;
   a radio frequency identification (RFID) probe system coupled to the SHIELD dielet, wherein the RFID probe system is installed inside the device; and
   a secure server system including one or more secure servers communicating with the RFID probe system, wherein:
   the secure server is configured to generate a temporary cipher key by using cryptographic operations on a combination of a random number and the immutable shared-secret cipher key, and
   the RFID probe system is configured to receive the random number from the secure server and to generate a matching cipher key by using the same cryptographic operations on the combination of the random number and the immutable shared-secret cipher key.

2. The system of claim 1 wherein the SHIELD dielet is affixed on a component of the device and/or the RFID probe system.

3. The system of claim 1 wherein the RFID probe system is installed in a peripheral component interconnect (PCI) card of the device.

4. The system of claim 1 wherein the RFID probe system communicates with the SHIELD dielet through radio frequency (RF) signals.

5. The system of claim 1, wherein the immutable shared-secret cipher key is registered with the secure sever system at the time that the SHIELD dielet is provided for the component.

6. The system of claim 1 wherein the security services include one or more services selected from a group consisting of assured software updating service, encryption key generation, exchange or management, network device or remote device authentication, software-defined host system anti-tamper, and trusted platform module (TPM) services.

7. A method for performing authentication of a device by using a multi-function supply chain hardware integrity for electronics defense (SHIELD) security system in which a RFID probe system communicates with a SHIELD dielet and a secure server system to verify authentication of a component of a device, comprising:
   receiving challenge request messages from the secure server system, wherein an immutable shared-secret cipher key is registered with the secure sever system, and the SHIELD dielet contains the immutable shared-secret cipher key;
   creating challenge response data using the SHIELD dielet upon receiving the challenge request messages;
   transmitting challenge responses to the secure server system;
   determining a status of the SHIELD dielet based on the challenge responses; and
   creating a temporary session cipher key that comprises:
      receiving a high-entropy random number from the secure server on the RFID probe system;
      generating the temporary cipher key on the secure server using cryptographic operations on a combination of the received random number and the immutable shared-secret cipher key; and
      generating a matching cipher key on the RFID probe system using the same cryptographic operations on the combination of the received random number and the immutable shared-secret cipher key, whereby identical temporary symmetric cipher keys are independently created without revealing the resulting matching cipher key over the network.

8. The method of claim 7 wherein the RFID probe system is installed inside the device.

9. The method of claim 7, wherein the immutable shared-secret cipher key is registered with the secure sever system at the time that the SHIELD dielet is provided for the component.

10. The method of claim 7, further comprising:
periodically creating the challenge request messages and transmitting the challenge request messages including the challenge data to the SHIELD dielet; and
receiving the challenge responses from the SHIELD dielet.

11. The method of claim 7, further comprising:
creating a hash of software or data at the time of transmission and installation or updating on the device by using the immutable shared-secret cipher key; and
registering the hash with a blockchain ledger registration server or the secure server system, wherein verification of the software provenance and confirmation that is installed on the authenticated device which the SHIELD dielet is affixed to is provided.

12. The method of claim 7, further comprising:
fingerprinting software or firmware or hardware members of the device; and
registering the fingerprinted software or firmware or hardware members with the secure server system, wherein the hardware members include one or more selected from a group consisting of removable storages, network interface cards (NICs), system BIOSes, and devices connected to the local network segment.

13. The method of claim 7, further comprising:
generating random numbers using a hardware random number generator (RNG) capabilities of the SHIELD dielet;
generating cryptographic keys for limited uses by utilizing a hardware encryption engine of the SHIELD dielet;
generating secure hash algorithm 1 (SHA-1) hashes utilizing the hardware encryption engine of the SHIELD dielet;
binding data by performing cryptographic operations using the immutable shared-secret cipher key as a storage root key (SRK) such that the data cannot be decrypted by any other computing device if the encrypted data is lost or stolen;
sealing data by performing the cryptographic operations on the data using the immutable shared-secret cipher key and a device configuration information including the hardware and software used such that the data cannot be unsealed by any other combination of hardware and software; and
storing said encrypted or sealed data in a persistent memory on the RFID probe system such that the data is protected from theft or tampering, whereby data confidentiality and integrity is provided.

14. The method of claim 13, further comprising:
receiving a request for said data from an authorized application;
decrypting or unsealing said data by performing cryptographic operations using the immutable shared-secret cipher key and the device configuration information; and
transmitting said data from the RFID probe system to the authorized application.

* * * * *